UNITED STATES PATENT OFFICE.

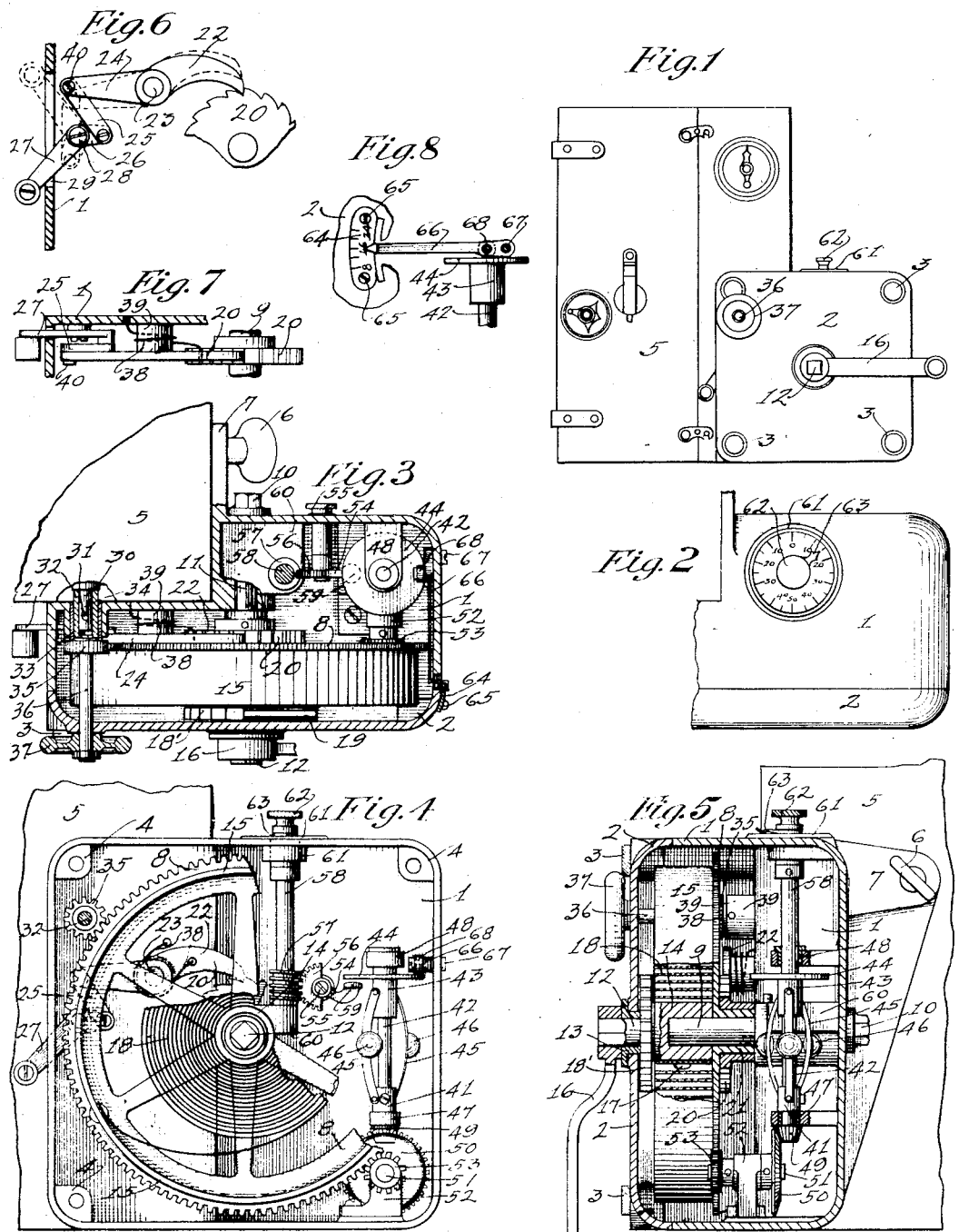

GEORGE J. TEAGUE, OF LOS ANGELES, CALIFORNIA, ASSIGNOR TO HERBERT S. BECKMAN, OF LOS ANGELES, CALIFORNIA.

CAMERA-ACTUATING MEANS.

1,262,284.  Specification of Letters Patent.  Patented Apr. 9, 1918.

Application filed December 27, 1916.  Serial No. 139,187.

*To all whom it may concern:*

Be it known that I, GEORGE J. TEAGUE, a citizen of the United States, residing at Los Angeles, in the county of Los Angeles and State of California, have invented new and useful Improvements in Camera-Actuating Means, of which the following is a specification.

My invention relates to camera actuating means or camera motors which may be applied to and used for operating the generally used types of motion picture cameras, and the primary object thereof is to provide a dependable means for operating the camera where electricity is not available and under many conditions undesirable, and, further for providing a uniform speed of the camera at all times and under all conditions.

A further object is to provide means for eliminating the human element in the operation of the camera and the substitution of a mechanical means, for at times when exciting scenes, such as wild animal and disaster scenes are being photographed, the operator is more or less subject to the influence of the scenes being enacted and as a consequence a variation in the operation of the crank may result which will render the pictures imperfect.

A further object is to provide a mechanical actuating means capable of continuous use at a uniform speed for a period of time sufficient to make about one hundred feet of negative film, which is about the usual maximum length of film in any one scene, and without interruption, except by design on the part of the operator.

A further object is to provide means for controlling the speed of the motor so that a maximum, medium and minimum speed may be provided for the camera operating shaft, at the will of the operator, and for indicating to the operator the speed of the machine at all times, for purposes of adjustment to varying conditions and necessities.

A further object is to provide a motor which may be readily attached to and as readily detached from the camera and which is capable of use under all conditions and at any place near to or remote from points where electricity is available.

A further object is to provide means for indicating the speed of the film through the camera in pictures per second at a convenient point visible to the operator. Other objects will appear as the description progresses.

Briefly described, my invention comprises a suitable two piece case in which is housed a spring actuated gear which drives a pinion on the camera crank shaft and another pinion which drives a governor for maintaining a uniform speed of the driver at all times. Means is provided for winding the spring in the driving gear and for releasing the driving gear at the will of the operator and for locking the same at the will of the operator. Other features consist of a speed controller coöperating with the governor for regulating the speed of the motor, and means for indicating the speed of the film through the camera in feet per second; all of which elements will be fully described in the detail description following.

Referring to the drawing, Figure 1 is a side elevation of an ordinary type of motion picture camera showing my motor attached thereto in readiness for operation. Fig. 2 is a partial top plan of the motor case showing my speed indicating mechanism mounted thereon. Fig. 3 is a sectional plan of the incased motor. Fig. 4 is a front elevation of Fig. 3 with the cover of the case omitted and certain parts broken away. Fig. 5 is a transverse sectional elevation of Fig. 4. Fig. 6 is a front view of the motor locking and releasing mechanism and Fig. 7 is a plan of the same. And Fig. 8 is a side elevation of the film speed indicating means with the case broken away.

In the several views of the drawing and throughout the specifications similar characters of reference indicate the same and like parts.

The motor case is composed of two parts, the rear or base member 1 and the front removable cover 2 which is secured to the member 1 by means of screws 3 at the four corners which tap into the bosses 4 of the member 1. The rear portion of the case is cut out at one corner to receive the camera 5 and the case may be attached to the camera box by means of a thumb screw 6 extending through the lug 7, or otherwise and at other points, if necessary.

A spring actuated driving gear 8 is preferably mounted in a central position in the case on a shaft 9 which has a cap nut 10 on its reduced outer end 11 for preventing a longitudinal movement of the shaft. The motor crank shaft 12 for winding the spring of the gear is journaled in a suitable bearing 13 in the front 2 of the case and the rear end 14 thereof is enlarged at a point within the rim 15 of the gear 8 and is bored out to receive the inner end of the driving gear shaft 9, as shown in Fig. 5. The outer end of the crank shaft is squared to receive the crank 16 which is loosely held thereby, and the enlarged portion of this shaft has a rivet or screw 17 secured thereto to which the inner end of the spiral spring 18 may be secured. Intermediate of the enlarged inner end 14 and the crank end of the shaft 12 a ratchet 18' is either formed on or suitably attached to the shaft and the teeth thereon are adapted to be engaged by a pawl 19 pivotally held on the front member 2 of the case, for preventing the unwinding of the spring 18.

A similar ratchet 20 is supported on and attached to the hub 21 of the gear 8, the teeth on this ratchet being reversely formed relative to those on the ratchet 18' and the ratchet 20 being adapted to rotate with the gear 8. A pawl 22, which is typical of the pawl 19, except for its connections, engages the teeth on the ratchet and is pivotally supported on a pin or screw 23 secured to the rear of the case. The rear or outer end of the pawl 22 forms an arm 24 which is pivotally connected by means of the link 25 to the shorter arm 26 of a locking and releasing lever 27 pivotally held in the case on a pin or screw 28 and the outer end of which extends through a slot 29 in the member 1 of the case, as shown in Fig. 6.

The outer end of the spring 18 is suitably attached to the rim 15 of the gear 8, as shown in Fig. 4, so that when the crank 16 is turned in an anti-clockwise direction the spring 18 will be wound on the shaft 12 of the crank and the gear 8 will be held against rotation by means of the pawl 22 and the ratchet 20, the ratchet 18' serving to hold the spring in tension at any point by means of the pawl 19.

The camera driving shaft 30 usually has a pin 31 secured thereto for holding the crank tightly thereon, and I provide a shaft 32 in alinement with the camera shaft 30 and journaled in a bearing 33 in the rear wall of the case 1, which is bored out to receive the end of the shaft 30 and has a slot 34 formed therein to receive the pin 31, thus locking the two shafts together for action, the shaft 32 sliding on the shaft 30 when the motor is attached to or detached from the camera.

A pinion 35 is tightly held on the shaft 32 which meshes with and is adapted to be driven by the gear 8, and the outer end of this shaft is reduced at 36 and is extended outwardly through the front 2 of the case where it is provided with a handwheel 37 in any suitable manner, for manually giving motion to the camera under certain conditions and where certain types of cameras are used which are not evenly balanced in operation.

A spring 38 which is secured at opposite ends to the rear wall of the case 1 and the inner end of the pawl 22 and may be wound around the boss 39 on the case, as shown in Fig. 3, serves to hold the pawl in engagement with the ratchet 20. When the camera is started, the pawl 22 may be released from the ratchet 20 by raising the outer end of the lever 27 to the position shown in broken lines in Fig. 6, and this movement of the lever 27 will move the link 25 which is connected with the pawl 22, slightly over the imaginary line cutting the axes of the pivot 40 on the pawl and the pin 28 which holds the lever, the tension of the spring thus being insufficient to restore the pawl to normal position. In such case the tension of the spring 18 on the gear 8 will operate the gears 8 and 35 and transmit motion to the camera shaft 30. The camera may be stopped at will by releasing and lowering the lever 27, thus permitting the restoration of the lever and pawl 22. When the pawl 22 is released from the ratchet 20, the spring is pulling against the pawl 19 in engagement with the ratchet 18'; and reversely, when the crank is turned for winding up the spring, the pull is against the pawl 22 in engagement with the ratchet 20.

The governor for regulating the speed of the motor is of the usual ball and spring type and comprises a sleeve 41 tightly held on the vertical shaft 42, a similar sleeve 43 slidably held on this shaft and having a disk 44 formed thereon, springs 45 secured at opposite ends to the sleeves 41 and 43 and balls 46 attached to the springs midway between their extremities. The shaft 42 is journaled at the top and bottom, respectively, in bearings 47 and 48 and is driven by means of bevel gears 49 and 50 attached, respectively, to the shaft 42 and a horizontal shaft 51 which is journaled in a suitable bracket 52 secured to the bottom of the case, a pinion 53 being carried by the shaft 51 which meshes with and is driven by the gear 8.

The governor, as shown, is geared up as high as possible so that a maximum speed may be had for best results, the balls 46 being thrown outwardly from the axis of the shaft 42 by centrifugal force, the springs 45, in such case, yielding outwardly from the axis, and the disk 44 being moved downwardly on the shaft 42 for a distance to correspond to the speed of the shaft 42 and the expansion of the springs. The governor, therefore, serves as a brake for the gear 8 and prevents the too rapid unwinding of the springs.

It is desirable at times to either increase or decrease the speed of the film through the camera for, respectively, decreasing or increasing the action of the picture, and for the purpose of permitting such adjustment of the speed. I provide a brake 54 which is pivotally held on a pin or screw 55 secured in the rear wall of the case and has a sector 56 with gear teeth formed thereon which meshes with and is operated by means of a worm 57 carried on a vertical shaft 58. The movement of the worm 57 in one or the other direction will correspondingly raise or lower the knob 59 on the brake to a point within the vertical path of the disk 44 of the governor for frictional engagement with the disk, and thus increase or decrease the friction on the governor, for limiting the speed thereof to a desired extent.

The shaft 58 is journaled at the bottom in a bearing 60 formed on the case 1 and at the top in the indicator dial 61 which is supported on the top of the case and is marked with graduations representing revolutions of the camera crank shaft per minute, as shown in Fig. 2. The upper end of the shaft 58 has secured thereto a knob 62 for manually turning the shaft and a pointer or indicator 63 which registers with the graduations on the dial. The dial is preferably subdivided into two semi-circular portions on each side of a central line, marked "o" on the dial, and the graduations on both sides increase in an ascending scale from this central point to a common point marked "50" opposite the point "o." Thus, considering the point "o" as the normal point or position for the end of the pointer 63 when the speed of the crank shaft is normal, or about 120 revolutions per minute, the movement of the pointer in either direction from the normal point will turn the shaft 58 and worm 57 in a corresponding direction, the brake knob 59 will also be thus moved upwardly or downwardly, as the case may be, and the friction on the governor disk 44 will be either increased or decreased proportionately.

It is obvious that when the brake is in its lowest position relative to the disk 44, the greatest speed of the governor will be permitted for the reason that a greater velocity of the governor balls will be necessary to effect their expansion to a point sufficiently remote from their axis as to permit the engagement of the disk with the brake. Reversely, the higher the position of the brake, the slower will be the speed of the governor. As the movement of the disk 44 on the shaft 42 is slight at the highest permissible speed, the adjustment of the brake knob is correspondingly slight, as the worm which operates the brake permits of a very fine adjustment, and the scope of the adjustment is within a whole turn of the worm.

The speed of the film in exposures per second is directly proportional to the speed of the camera crank shaft in revolutions per minute and the indicating means just described is for the purpose of indicating to the operator the revolutions of the crank shaft per minute. The dial 61, as shown, indicates the number of revolutions per minute in excess of or less than the normal speed of about 120 per minute. Usually, the film speed in exposures per second is about 16 for an average or normal rate, and if desirable the dial 61 may also be marked at points on opposite sides of the normal point of the dial for indicating the corresponding number of exposures per second. For instance, 8, 12, 16 and 24; 8 being the slowest practical rate of speed of the film and 24 the highest and 16 the normal.

It may in many instances be preferable to separately indicate the latter features, and I, therefore, provide a sector plate 64 which is attached to the outside of the cover 2 by means of screws 65 and has the graduations from 8 to 24 marked thereon, as shown in Fig. 8. A pointer 66 is pivoted to the case 2 at a point slightly to the rear of the longitudinal center line of the governor disk 44 on a screw 67 and revolubly carries a roller 68 at a point forward of its fulcrum which rides on the upper surface of the disk 44 and is adapted to be moved upwardly and downwardly from the normal line thereby. The outer end of this pointer is bent outwardly and extends through the case in proximity to the edge of the sector plate 64. The pointer may be held in contact with the disk by means of a suitable spring of but slight tension, or by gravity, preferably the latter, so that the action of the governor may not in any way be influenced or unduly restricted in the employment of the indicator.

It will be understood that the use of this device will in no way interfere with the use of the camera without the device, as no changes are necessary to the camera and it may be readily detached upon occasion. Easy access may be had to the motor case without disturbing or removing any of the internal mechanism, and an even smooth operation of the camera will result from its use. The starting and stopping devices permit of quick regulation of the camera, and the indicating means described permit of more accurate work in the case of double exposures, for the speed of the motor may be regulated to the same point when two exposures are made on the same film. Better and more perfect pictures will result from the use of the motor than from present methods of operation, for the time of the operator may be more profitably employed in the creation of artistic lighting and other effects, thus lending art to the operation of the camera and enabling the operator to concentrate his attention on the more important operations than the mere turning of the camera crank.

Having thus described my invention, what I claim, is:

1. In a camera actuating means, a driven element removably attachable to the camera driving shaft, a driving element directly connected therewith, a governor for regulating the speed of said driven element, and manually operated locking and unlocking means for direct engagement with said driven element for controlling the operation of said driving and driven elements.

2. In a camera actuating means, a housing, a driven element revolubly mounted in said housing and having an extension for direct attachment to the camera driving shaft, a driving element operably connected therewith, means connected with said driving element for locking the same against rotation and capable of disconnection therefrom at will for permitting the rotation thereof, and a governor for maintaining a uniform speed of said driving and driven elements.

3. In a camera actuating means, a housing having separable front and back members, a spring driven element pivotally supported therein for operation, a gear on said spring driven element, a shaft paralleling the axis of said gear revoluble in and extended from said housing, a gear on said shaft meshing with said first mentioned gear and rotatable thereby, manually operated means for engagement with and for controlling the operation of said spring driven element, and governor means for maintaining a uniform speed of said rotating elements.

4. In a camera actuating means, the combination with the camera having a driving shaft extended therefrom, a housing removably attachable to said camera, a driven shaft mounted in said housing and extended therefrom for attachment to and for operating said camera driving shaft, a spring actuated driving element pivotally supported in said housing, gearing on said driven shaft and said spring actuating driving element, manually operated locking means for engagement with said driven element for regulating the operation of said actuating means, and a governor operated by said driving element for maintaining a uniform speed of the camera.

5. In a camera actuating means, a housing, a driven shaft extended therefrom for attachment to the camera crank shaft at will, a driving element therefor, gearing for operably connecting said driving and driven elements, means for manually operating said driven shaft, manually operated ratchet means for locking and unlocking said driving and driven elements for and against rotation, and a governor for maintaining a uniform speed of the camera.

6. In a camera actuating means, a driving and a driven element direct connected for operation, means for attaching said driven element to the camera driving shaft, manually operated ratchet locking means for engagement with said driving element, a governor for maintaining a uniform speed of the camera, and an indicator for engagement with and for indicating the speed of said camera.

7. In a camera actuating means, a driving element, a driven element removably attachable to the camera, gearing for operably connecting said driving and driven elements, a governor for regulating the speed of said elements, a needle indicator having a fixed fulcrum and in engagement with said governor for amplifying any variation in the speed of said governor, and a graduated scale within the arc of movement of the free end of said indicator for registering the speed of said camera.

8. In a camera actuating means, a housing removably attachable to the camera, a spring actuated driving element operably supported therewithin, a driven element operated thereby and detachably connected with the camera crank shaft, gearing for operably connecting said driving and driven elements, a governor for regulating the speed of said elements, and a needle indicator in engagement with and operated by said governor for indicating the variation in the speed of the film through said camera, and means connected with said driving element for indicating the speed of the camera crank shaft.

9. In a camera actuating means, a housing detachably held in connection with the camera, a driving and a driven element supported for operation therein, gearing for connecting said elements for operation, manually operated means for controlling the operation of said elements, a governor for regulating the speed thereof, and independent means for indicating the relative speeds of the subjective in the camera and the camera crank shaft.

Signed at Los Angeles, in the county of Los Angeles and State of California, this 16th day of Dec., 1916.

GEORGE J. TEAGUE.

Witnesses:
CARL W. BECKMAN,
J. P. BURROWS, Jr.